United States Patent [19]
Basile

[11] 3,922,624
[45] Nov. 25, 1975

[54] AUTOMATIC CIRCUIT RESTORATION DEVICE FOR POLYPHASE SUPPLY LINES

[76] Inventor: Pietro Basile, Via Gramsci 146, S. Giovanni In Fiore, Italy

[22] Filed: Aug. 9, 1974

[21] Appl. No.: 496,198

[30] Foreign Application Priority Data
Aug. 17, 1973 Italy .................. 86275/73

[52] U.S. Cl. ..................... 335/26; 317/46
[51] Int. Cl.² ......................... H02H 3/08
[58] Field of Search ........... 335/8, 9, 10, 26, 256, 335/259; 317/22, 23, 24, 46, 47

[56] References Cited
UNITED STATES PATENTS

| | | | |
|---|---|---|---|
| 1,799,932 | 4/1931 | Simon | 317/46 |
| 2,528,777 | 11/1950 | Persons | 335/259 |
| 2,965,809 | 12/1960 | Edsall | 317/46 |
| 3,510,811 | 5/1970 | Pokorny et al. | 317/46 |

*Primary Examiner*—Harold Broome
*Attorney, Agent, or Firm*—Bucknam and Archer

[57] ABSTRACT

A self-restoring circuit breaker apparatus having a main circuit breaker and operating coil and auxiliary operating coils connected such that when a fault occurs in any one or more of a plurality of feeder lines, as sensed by a corresponding coil, sets of switching contacts on the main circuit breaker are opened to interrupt power flow beyond monitoring points on all feeder lines.

4 Claims, 4 Drawing Figures

AUTOMATIC CIRCUIT RESTORATION DEVICE FOR POLYPHASE SUPPLY LINES

This invention relates to an automatic circuit restoration device to be used in connection with a circuit breaker for load protection in a polyphase supply line.

Circuit breakers which open the supply line for load protection upon failure of one or more phases of the supply voltage are known. However, once they have interrupted the circuit, a manual operation is required to restore circuit continuity after all the phases have become operative again.

Accordingly, it is a main object of the invention to provide a circuit restoration device adapted to operate in connection with such a circuit breaker for automatically restoring circuit continuity after a temporary phase failure without manual intervention. It is another object to do so without detrimentally affecting the safety of operation of the circuit breaker.

These and other objects and advantages of the invention are achieved by providing a circuit restoration device for use in combination with a circuit breaker in a polyphase supply line having a plurality of phase conductors and a neutral conductor, where an operating coil for the circuit breaker is connected between a first one of the phase conductors and the neutral conductor, the device comprising: a frame; a fixed contact carried on the frame; a swiveling plate mounted pivotally on the frame and carrying a movable contact, the swiveling plate having a first position in which the movable contact is in contact with the fixed contact, and a second position in which the movable contact is separated from the first contact, the swiveling plate being normally biased to its first position; a number of electromagnetic relays equal to the number of phase conductors minus one, the relays being rigidly mounted on the frame and each having a plunger adapted to cooperate with the swiveling plate so as to keep it displaced to the second position when the associated relay is not energized and to withdraw clear of the swiveling plate when the associated relay is energized; whereby the swiveling plate occupies its first position under the action of its bias when all the relays are energized, while it occupies the second position under the action of at least one plunger when at least one of the relays is energized.

The invention is further explained in the following disclosure of a preferred embodiment, with reference to the accompanying drawings, wherein.

Figure 1:
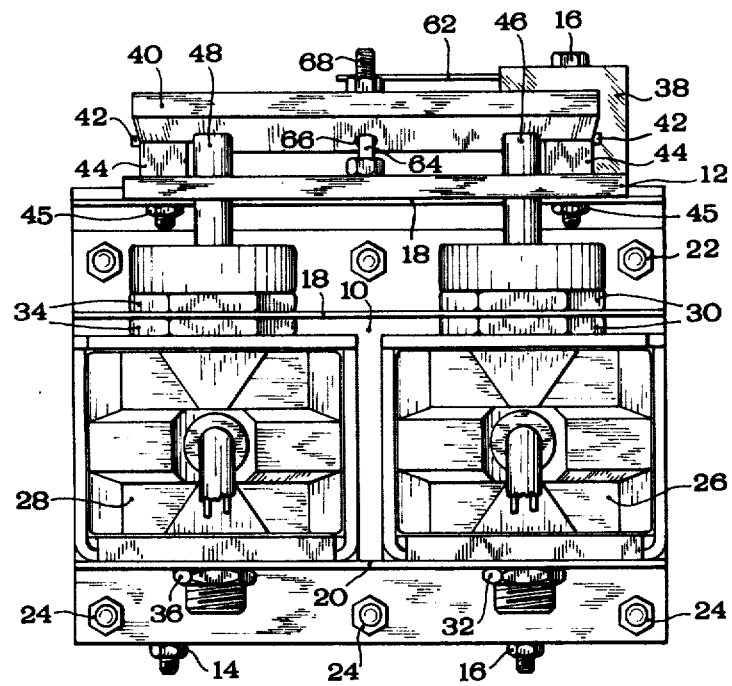
FIG. 1 is a front view of a circuit restoration device according to the invention.
Figure 3:
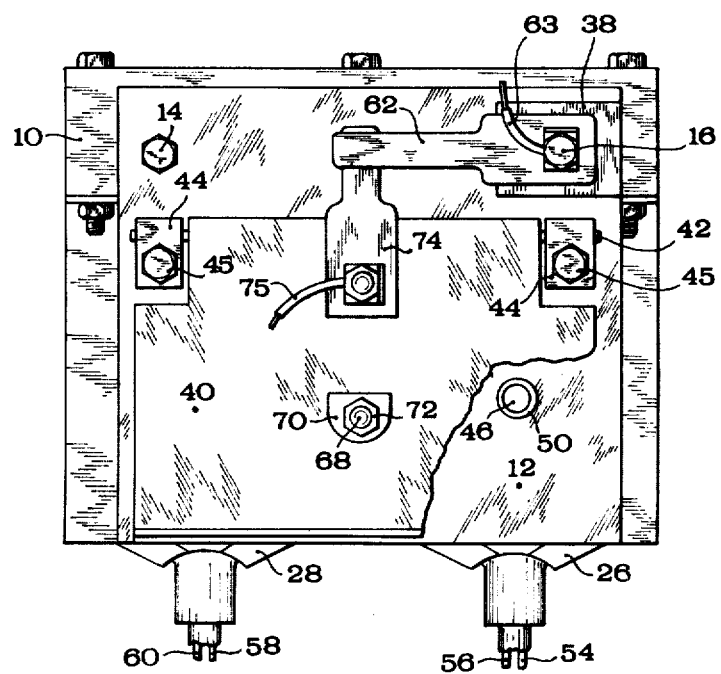
FIG. 3 is a top view of the same device.
Figure 2:
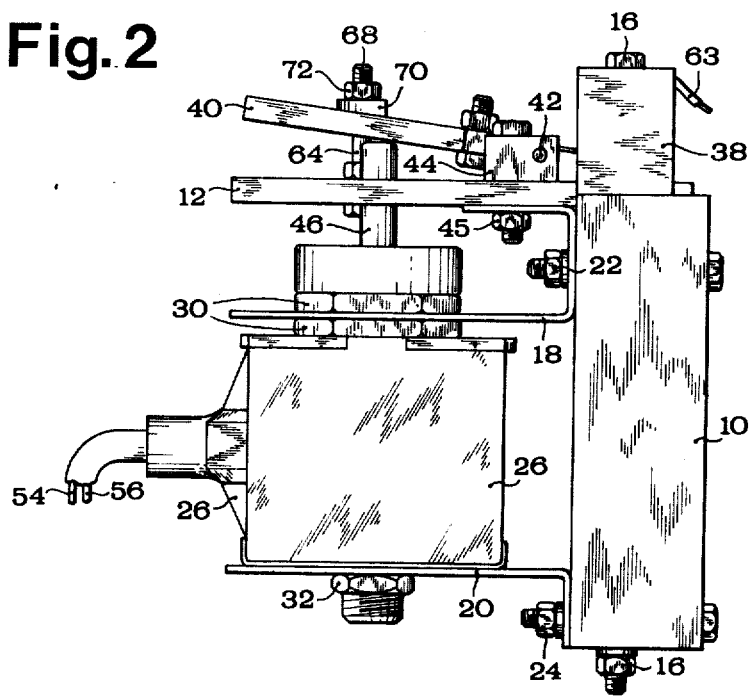
FIG. 2 is a side view of the same device.

With reference to FIGS. 1, 2 and 3 of the drawings, a circuit restoration device according to the invention comprises an erect main frame 10, a cantilevered plate 12 extending horizontally from the upper edge of the main frame and fixed to the frame by means of nuts and bolts 14, 16, an upper bracket 18 and a lower bracket 20 which are mounted on the main frame by means of nuts and bolts 22, 24, respectively, encased electromagnetic relay coils 26, 28 carried between the brackets 18, 20 and fixed by means of locking nuts 30, 32, 34, 36, a contact support block 38 carried upon the upper edge of the main frame by means of the nut-and-bolt arrangement 16 which also fastens the plate 12, and a swiveling plate 40 which is pivotally mounted on the cantilevered plate 12 by means of a horizontal shaft 42 supported by support blocks 44, which are secured to the upper face of plate 12 by nuts and bolts 45.

The relay coils 26, 28 have rodlike plungers 46, 48, respectively, which extend upwardly through aligned apertures such as 50 in the plate 12. Each relay 26, 28 comprises encased conventional windings (not shown in FIGS. 1, 2 and 3) having energizing leads 54, 56, and 58, 60, respectively. Springs (not shown) in the relay coils 26, 28 normally bias the plungers to a lifted position where the plungers extend completely upwardly. Energization of a relay draws the associated plunger in, to a position where it is approximately flush with the upper face of the plate 12.

The contact support block 38 supports a fixed contact reed 62 extending horizontally toward the middle area of the upper edge of the main frame 10.

A lead 63 allows the contact reed 62 to be connected to an external circuit (not shown).

The swiveling plate 40 has a movable contact reed 74 fastened so as to extend with its tip underneath the fixed contact reed 62. A lead 75 allows to connect the contact reed 74 to an external circuit (not shown).

The cantilevered plate 12 carries an upwardly extending post 64 passing through a central aperture 66 in the swiveling plate 40. The post 64 has a threaded upper end 68 upon which an abutment block 70 is threaded and locked by means of a locking nut 72. The abutment block 70 has a beveled lower face larger than the aperture 66 in the swiveling plate 40, so as to provide an abutment for the swiveling plate when it is rotated clockwise on FIG. 2.

When both relay coils 26, 28 are energized, the tips of the plungers 46, 48 are more or less flush with the upper face of plate 12, and the swiveling plate 40 is drawn downward by gravity and rests upon the plate 12. The movable contact reed 74 is then lifted and contacts the fixed contact reed 62, thus completing a circuit through the contacts.

When at least one of the relay coils 26, 28 is not energized, the associated plunger is lifted and pushes the swiveling plate 40 upwards until it abuts against the abutment block 70. The contact reeds 62, 74 are then separated and the circuit through them is interrupted.

Figure 4:
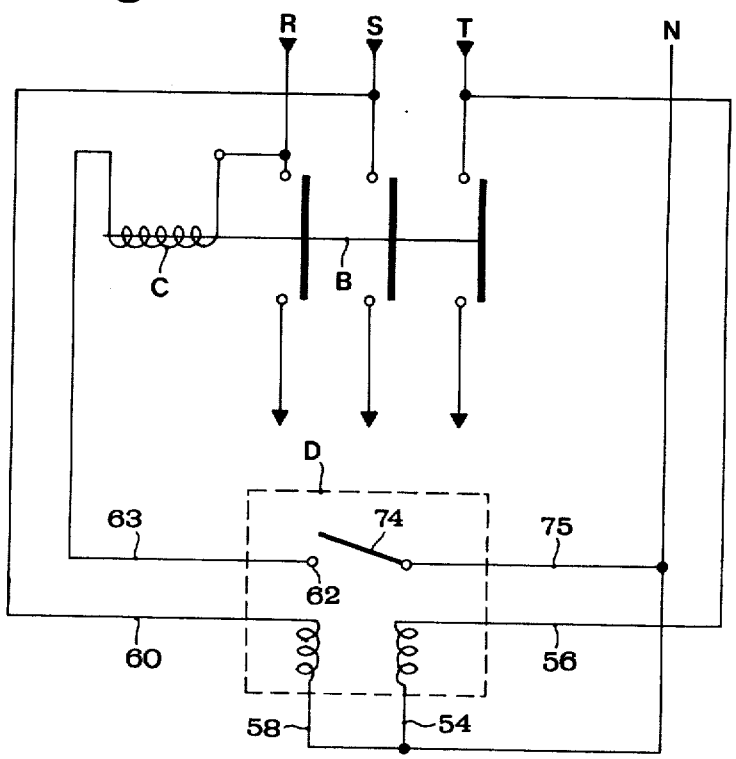
FIG. 4 is a circuit diagram showing how the circuit restoration device according to the invention is connected in a supply line provided with a protection circuit breaker.

On FIG. 4, the device according to FIGS. 1, 2 and 3 has been schematically shown as D. An electromagnetically operated, three-pole, two-position switch B acts as a circuit breaker connected in series in the phase conductors R, S, T of a three-phase supply line. An operating winding C for the circuit breaker is connected between the phase R of the supply line and the fixed contact 62 of the circuit restoration device. The movable contact is connected to the neutral conductor N of the supply line. Corresponding sides 54, 58 of the relay coils 26, 28 are connected to the neutral conductor N of the supply line, while the opposite sides 56, 60 are connected to the phase conductors S and T, respectively.

When all the phases R, S and T are operative, both relays are energized, the contacts 62, 74 are closed, and current flows from phase R through coil C, contacts 62, 74 to the neutral. The circuit breaker B is closed.

When phase R fails, energization of the coil C is interrupted although the circuit is complete, and the circuit breaker B opens. As soon as the phase is restored, however, coil C is energized again, thus closing the circuit breaker.

If one or both of phases S or T fails, the associated relay (or relays) is energized, the associated plunger (or plungers) extends upwardly, the swiveling plate 40 is lifted and the contacts 62, 74 are opened. Energizing current through the coil C stops, and the circuit breaker B interrupts the main circuit. When the phases S and T are both restored, the associated plungers drop, the swiveling plate 40 comes to rest upon the cantilevered plate, the contacts 62, 74 are closed again and the coil C is energized to restore the continuity of the main or supply circuit.

It is easy to see that every other combination of phase failures will in every case give rise to the appropriate response, i.e. to opening of the main circuit. Also, in every case the continuity of the circuit will only be restored when all the phases are operative again.

The device as disclosed and shown can easily be extended to polyphase lines having more than three phases. An extra relay will have to be provided for interaction with the swiveling plate for each further phase. One of the phases will be in every case connected directly to the coil C.

From the foregoing, it can be appreciated by the artisan that the invention provides a self-restoring circuit breaker apparatus having an electric power supply having a plurality of feeder lines R, S, T, which apparatus comprises a relay type main circuit breaker having a main operating coil C energized by electric power supplied by one of the feeder lines, namely line R, and plural sets of switching contacts B, eacn set being connected in series with a corresponding feeder line at a monitoring point thereon. The sets of contacts B are operable by the coil C in unison upon a given deenergization of such coil C to establish respective open circuit conditions in all lines R, S and T, thereby interrupting the flow of power beyond each monitoring point. Auxiliary coils are each connected by conductors 60 and 56 to corresponding individual remaining feeder lines S and T for energization thereby. Associated with these auxiliary operating coils is switching means 62 and 64 connected in series by lines 64 and 65 with the main coil C and operated by the auxiliary coils 26 and 28 upon a given deenergization of any one of them to establish an open circuit interrupting the supply of power to the main coil C. Thus, regardless of which one of the lines R, S and T experiences a fault, there will be interruption of all lines beyond the monitoring point.

Although a preferred embodiment has been shown and described, a person skilled in the art will readily find modifications which are all included in the scope of the invention so far as they are embraced by the attached claims.

I claim as my invention:

1. A self-restoring circuit breaker apparatus for an electric power supply having a plurality of feeder lines, which apparatus comprises a main circuit breaker having a main operating coil energized by electric power supplied by one of said feeder lines, said main circuit breaker having plural sets of switching contacts each set being connected in series with a corresponding feeder line at a monitoring point thereon, said sets of switching contacts being operable by the main operating coil in unison upon a given deenergization of said main operating coil to establish respective open circuit conditions in all of said feeder lines to interrupt the flow of power beyond each monitoring point; a plurality of auxiliary operating coils each connected to a corresponding one of the remaining feeder lines for energization thereby; and switching means connected in series with said main operating coil and operated by said auxiliary operating coils upon a given deenergization of any one of them to establish an open circuit interrupting the supply of power to the main operating coil, whereby a fault in the feeder line supplying the main operating coil will effect interruption of power on all feeder lines, and a fault in any other feeder line will also effect interruption of power on all feeder lines.

2. A self-restoring circuit breaker apparatus according to claim 1 wherein said switching means includes a plate bearing a switching contact and disposed for movement relative to another switching contact, and a plurality of armatures disposed for movement by respective auxiliary operating coils, said armatures and plate being disposed for engagement in accordance with the energization of said auxiliary coils to establish an open circuit condition between the switch and contact borne by the plate and said other switching contact when any one of said auxiliary coils is deenergized.

3. A self-restoring circuit breaker apparatus according to claim 2 wherein said plate is supported for pivotal movement under the influence of gravity.

4. A self-restoring circuit breaker apparatus according to claim 3 wherein said armatures are disposed in underlying relation to said plate for generally vertical movement between a high position wherein they lift said plate and establish said open circuit condition, and a low position clear of said plate wherein a closed circuit condition of said contacts is established.

* * * * *